(12) United States Patent
Fliegl, Sr.

(10) Patent No.: US 11,180,066 B2
(45) Date of Patent: Nov. 23, 2021

(54) PUSH-OFF DEVICE AND PUSH-OFF VEHICLE COMPRISING A PUSH-OFF DEVICE

(71) Applicant: FLIEGL AGRARTECHNIK GMBH, Mühldorf (DE)

(72) Inventor: Josef Fliegl, Sr., Kastl (DE)

(73) Assignee: FLIEGL AGRARTECHNIK GMBH, Mühldorf (DE)

( * ) Notice: Subject to any disclaimer, the term of this patent is extended or adjusted under 35 U.S.C. 154(b) by 0 days.

(21) Appl. No.: 16/304,996

(22) PCT Filed: Feb. 17, 2017

(86) PCT No.: PCT/EP2017/053635
§ 371 (c)(1),
(2) Date: Nov. 27, 2018

(87) PCT Pub. No.: WO2017/207120
PCT Pub. Date: Dec. 7, 2017

(65) Prior Publication Data
US 2020/0215953 A1    Jul. 9, 2020

(30) Foreign Application Priority Data
Jun. 1, 2016    (DE) .......................... 102016110138.9

(51) Int. Cl.
*B60P 1/00*    (2006.01)
*B60R 5/04*    (2006.01)
(Continued)

(52) U.S. Cl.
CPC ................ *B60P 1/006* (2013.01); *B60R 5/04* (2013.01); *A01C 3/066* (2013.01); *A01D 90/10* (2013.01);
(Continued)

(58) Field of Classification Search
CPC ...................................................... B60P 1/006
See application file for complete search history.

(56) References Cited

U.S. PATENT DOCUMENTS 3,815,764 A * 6/1974 Gilfillan .................. B60P 1/006
414/513
3,998,343 A * 12/1976 Fors ........................ B60P 1/006
414/501
(Continued)

FOREIGN PATENT DOCUMENTS

BR    102015017218 A2    3/2016
EP       0277733 A1    8/1988
(Continued)

OTHER PUBLICATIONS

PCT; App. No. PCT/EP2017/053635; International Search Report and Written Opinion dated Apr. 24, 2017; pp. 1-14.
(Continued)

*Primary Examiner* — Jonathan Snelting
(74) *Attorney, Agent, or Firm* — Fitch, Even, Tabin & Flannery LLP

(57) ABSTRACT

The invention relates to a push-off device, in particular for agricultural cargo. The push-off device includes a loading space, which comprises a loading floor, two laterally adjoining sidewalls and a push-off wall. The push-off device further includes a first hydraulic cylinder arrangement, which comprises one first hydraulic cylinder piston that is movable in a first hydraulic cylinder tube and a second hydraulic cylinder arrangement, which comprises one second hydraulic cylinder piston that is movable in a second hydraulic cylinder tube. The push-off wall is mounted to be displaceable in a longitudinal direction of the loading space on the second hydraulic cylinder tube and by operation of the first hydraulic cylinder arrangement is displaceable relative to the sliding floor, which is displaceable by opera-
(Continued)

tion of the second hydraulic cylinder arrangement relative to the loading floor of the loading space. The invention moreover relates to a push-off vehicle comprising a sliding device.

10 Claims, 4 Drawing Sheets

(51) Int. Cl.
*A01C 3/06* (2006.01)
*A01D 90/10* (2006.01)
*B65D 88/12* (2006.01)
*B65F 3/28* (2006.01)

(52) U.S. Cl.
CPC .............. *B60P 1/003* (2013.01); *B65D 88/12* (2013.01); *B65F 3/28* (2013.01)

(56) References Cited

U.S. PATENT DOCUMENTS

| | | | |
|---|---|---|---|
| 4,220,280 A | | 9/1980 | Trott et al. |
| 4,576,540 A | * | 3/1986 | Derain ...................... B65F 3/28 100/295 |
| 8,061,950 B2 | * | 11/2011 | Haub .................... B30B 9/3042 414/416.03 |

FOREIGN PATENT DOCUMENTS

| | | |
|---|---|---|
| EP | 0992396 A2 | 4/2000 |
| EP | 1609668 A2 | 12/2005 |
| EP | 3045348 A1 | 7/2016 |
| EP | 3118057 A1 | 1/2017 |
| FR | 2862294 A1 | 5/2005 |
| GB | 2036687 A | 7/1980 |
| JP | 58183324 A | 10/1983 |
| JP | S58183324 A | 10/1983 |

OTHER PUBLICATIONS

IPONZ; App. No. 748528; First Examination Report dated Jul. 26, 2019; pp. 1-4.
FIPS; App. No. 2018146434/12(077556); Official Action dated Sep. 18, 2019; pp. 1-8.
FIPS; App No. 2018146434/12(077556); Search Report dated Sep. 18, 2019; pp. 1-4.
JPO; App. No. JP2018-562114; Notice of Reason for Refusal dated Mar. 6, 2020; pp. 1-7.

* cited by examiner

PUSH-OFF DEVICE AND PUSH-OFF VEHICLE COMPRISING A PUSH-OFF DEVICE

CROSS-REFERENCE TO RELATED APPLICATIONS

This application is a U.S. national phase application filed under 35 U.S.C. § 371 of International Application Number PCT/EP2017/053635, filed Feb. 17, 2017, designating the United States, which claims benefit of German Patent Application No. 10 2016 110 138.9, filed on Jun. 1, 2016.

FIELD

The invention relates to a push-off device of the kind indicated in the preamble of patent claim 1. Moreover, the invention relates to a push-off vehicle comprising a push-off device.

BACKGROUND

The EP 1 609 668 A2 shows a trailer configured as a push-off vehicle comprising a push-off device. The push-off device serves in particular for loading and unloading agricultural cargo. The push-off device comprises a loading space with a loading floor, two laterally adjoining sidewalls and a push-off wall. The push-off wall therein is slidable in longitudinal direction of the loading space relative to a sliding floor, which in turn is displaceable in longitudinal direction of the loading space relative to the loading floor of the loading space. The push-off wall therein can be slid by means of a threaded spindle relative to the sliding floor, wherein the sliding floor in turn is displaceable by means of a cylinder piston arrangement relative to the sliding floor of the loading space. The relative movability of the push-off wall relative to the sliding floor that in turn is displaceable is facilitated by the fact that the push-off wall is mounted by means of sliding elements in the manner of a sliding carriage on a guiding profile enclosing the thread spindle.

It is the objective of the present invention to provide a push-off device of the initially mentioned kind, which has a particularly simple setup.

SUMMARY

This objective is solved by a push-off device having the features of patent claim 1. Advantageous embodiments with expedient and non-trivial further developments of the invention are indicated in the dependent claims.

The push-off device according to the invention, in particular for agricultural cargo, comprises a loading space with a loading floor, two laterally adjoining sidewalls and a push-off wall. The push-off wall therein is displaceable in longitudinal direction of the loading space relative to a sliding floor, which in turn is displaceable in longitudinal direction of the loading space relative to the loading floor of the loading space. In order to realize a particularly simple setup of the push-off device, it is envisaged according to the invention that the push-off device comprises a first hydraulic cylinder arrangement comprising at least one first hydraulic cylinder piston that is movable in a first hydraulic cylinder tube. Further, it is envisaged according to the invention that the push-off device comprises a second hydraulic cylinder arrangement, which comprises at least one hydraulic cylinder piston that is movable in a second hydraulic cylinder tube. It is also possible that the first and/or the second hydraulic cylinder arrangement comprises several hydraulic cylinder tubes and hydraulic cylinder pistons. The first hydraulic cylinder arrangement and/or the second hydraulic cylinder arrangement consequently can also be a cylinder bundle. The push-off wall according to the invention is mounted on the second hydraulic cylinder tube to be displaceable in the longitudinal direction of the loading space and by means of the first hydraulic cylinder arrangement is displaceable relative to the sliding floor, which by means of the second hydraulic cylinder arrangement is displaceable relative to the loading floor of the loading space. Preferably, the hydraulic cylinder tubes and the hydraulic cylinder pistons are aligned in parallel with the loading floor, wherein the main extension direction of the hydraulic cylinder tubes and the hydraulic cylinder pistons extends in longitudinal direction of the push-off direction and thus also in longitudinal direction of the loading space.

By means of the two hydraulic cylinder arrangements it is consequently possible to displace the push-off wall back and forth between a retracted loading position and an extended unloading position. The retracted loading position is taken when both hydraulic cylinder pistons have been fully retracted, wherein the extended unloading position is taken when both hydraulic cylinder pistons have been fully extended. Preferably the push-off wall is in the extended unloading position in the area of a front edge of the loading floor of the loading space so that cargo received in the loading space can be pushed off by means of the push-off wall from the loading floor. In the retracted loading position, however, the push-off wall is preferably positioned opposite the front edge of the loading floor in the region of a rear edge of the loading floor so that in the loading position the largest possible loading space to be made available is provided by a corresponding positioning of the push-off wall.

In order to realize a particularly simple setup of the push-off device, it is envisaged that the second hydraulic cylinder tube serves as linear guidance for the translational movement of the push-off wall. In contrast to the push-off device shown in the EP 1 609 668 A2 consequently no separate guiding profile is necessary anymore in order to realize the translational relative movement of the push-off wall relative to the sliding floor that in turn is displaceable itself. Since additional guiding profiles or guiding rails due to the linear guiding function of the second hydraulic cylinder can be saved, correspondingly a lot of weight can be saved in the push-off device. Due to the reduced number of parts also the manufacturing effort involved in the push-off device is substantially more favorable than in the case of the initially cited prior art. Moreover also fewer movable hydraulic hoses are needed, wherein ultimately also the push-off device on the whole can be designed to be optically more appealing. Preferably the first hydraulic cylinder arrangement is arranged above the second hydraulic cylinder arrangement in the vertical direction of the push-off device.

An advantageous embodiment of the invention envisages that the first hydraulic cylinder tube is attached to the second hydraulic cylinder tube and the first hydraulic cylinder piston to the push-off wall. Consequently, the second hydraulic cylinder tube preferably serves not only as linear guidance for the translational movement of the push-off wall but additionally also for attaching the first hydraulic cylinder tube. Due to this additional function integration with regard to the second hydraulic cylinder tube once again parts and thus also weight can be saved in the push-off device. The first hydraulic cylinder arrangement consequently preferably supports on the second hydraulic cylinder tube and thus can move the push-off wall relative to the sliding floor by extending and retracting the first hydraulic cylinder piston.

A further advantageous embodiment of the invention envisages that the second hydraulic cylinder piston is attached to the loading floor of the loading space and the second hydraulic cylinder tube to the sliding floor. The second hydraulic cylinder arrangement consequently rests against the immovable loading floor and thus by extending and retracting the second hydraulic cylinder piston can move the push-off floor relative to the loading floor. Since the second hydraulic cylinder piston is attached to the immovable loading floor, consequently in the case of the second hydraulic cylinder arrangement the second hydraulic cylinder tube moves relative to the loading floor, if the second hydraulic cylinder piston is extended or retracted. When moving the sliding floor then consequently also the push-off wall is moved relative to the loading floor and the sidewalls. In order to realize a particularly simple control of the two hydraulic cylinder arrangements, therein it can be envisaged that these are applied with pressure from the same circuit with a hydraulic medium. Depending on occurring movement resistances with regard to the displacement of the push-off wall and the sliding floor then the respective hydraulic cylinder pistons in some circumstances are extended and retracted at different speeds until they have reached their respective end positions.

In a further advantageous embodiment of invention it is envisaged that on the front side at a closed end of the second hydraulic cylinder tube a bearing element extending in radial direction is attached, under the mediation of which the second hydraulic cylinder tube is attached to the sliding floor. For instance the bearing element can be welded both to the second hydraulic cylinder tube as well as to the sliding floor. Other attachment possibilities of the second hydraulic tube to the sliding floor, however, are equally possible.

In a further advantageous embodiment of the invention it is envisaged that on the front side at a closed end of the second hydraulic cylinder tube a bearing element extending in radial direction is attached, under the mediation of which the second hydraulic cylinder piston is attached to the loading floor of the loading space. The loading element can for instance be welded to the loading floor and to the free end of the second hydraulic cylinder piston or else be otherwise attached. In any case the second hydraulic cylinder piston preferably is aligned in parallel with the loading floor and correspondingly spaced so that the second hydraulic cylinder piston upon retracting and extending does not touch the loading floor.

According to a further advantageous embodiment of the invention it is envisaged that the first hydraulic cylinder piston and the second hydraulic cylinder piston are arranged to be extendable in opposite directions. Preferably the second hydraulic cylinder piston has an inner bore extending in axial direction for supplying the second hydraulic cylinder arrangement with a hydraulic liquid. By the extendability of the two hydraulic cylinder pistons in opposite directions it is facilitated in a simple manner to attach the second hydraulic cylinder tube to the first hydraulic cylinder tube and use the second hydraulic cylinder tube as linear guidance for the push-off wall.

A further advantageous embodiment of the invention envisages that the first hydraulic cylinder tube and the second hydraulic cylinder tube are attached to each other at respective longitudinal ends, from which respective hydraulic cylinder pistons are extendable. This makes sense in particular if the two hydraulic cylinder pistons are arranged to be extendable in opposite directions since in the case of this arrangement the maximal stroke travel can be achieved by retracting and extending the respective hydraulic cylinder piston.

In further advantageous embodiment of the invention it is envisaged that the push-off wall is mounted by means of at least one sliding element, which encloses the second hydraulic cylinder tube at least on the outer circumference, on the second hydraulic cylinder tube. Preferably the push-off wall is mounted by means of a further sliding element, which encloses the second hydraulic cylinder tube equally at least partly on the side of the outer circumference and is spaced apart from the other sliding element in axial direction, on the second hydraulic cylinder tube. The two sliding elements consequently serve as a kind of sliding carriage, by means of which the push-off wall is movably mounted to slide on the second hydraulic cylinder tube. For instance the second hydraulic cylinder tube therein can be arranged in radial direction distant enough from the sliding floor that the two sliding elements can fully enclose the second hydraulic cylinder tube. In such case a particularly stable sliding mounting of the push-off wall on the second hydraulic cylinder can be realized.

The push-off vehicle according to the invention comprises the push-off device according to the invention or an advantageous embodiment of the push-off device according to the invention. The push-off vehicle for instance can be a trailer, which can be pulled by a traction vehicle, such as for instance a tractor or also by a truck. Alternatively, however, it is also possible that the push-off device is realized as part of a container, such as for instance an ISO container or the like.

Further advantages, features and details of the invention derive from the following description of a preferred embodiment as well as by reference to the drawing. The features and feature combinations previously mentioned in the description as well as named in the following in the description of the figures and/or shown in the figures alone can be used not only in the indicated combination but also taken alone, without departing from the scope of the invention.

DESCRIPTION OF THE PREFERRED EMBODIMENTS

In the figures identical or functionally identical elements are equipped with the same reference signs.

Figure 1:
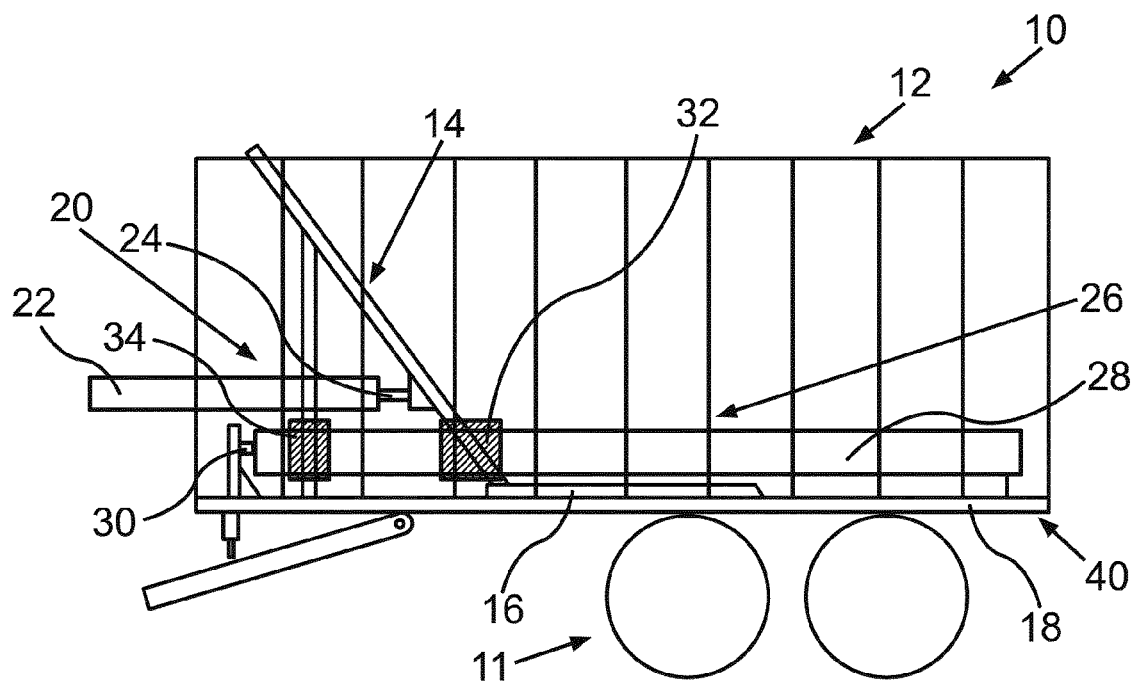
FIG. 1 a partly transparent schematic lateral view of a push-off vehicle configured as trailer with a push-off device, which comprises a loading space comprising a loading floor, two laterally adjoining sidewalls and a push-off wall, which is displaceable in longitudinal direction of the loading space relative to a sliding floor, which in turn is displaceable in longitudinal direction of the loading space relative to the loading floor of the loading space.

A push-off vehicle 10, which is configured as a trailer, is shown in a schematic partly transparent lateral view in FIG. 1. The push-off vehicle 10 comprises a here only schematically suggested chassis 11, at or on which a push-off device 12 is received. The push-off device 12 comprises a push-off wall 14, which is displaceable relative to a sliding floor 16, which in turn is displaceable relative to a loading floor 18. For sliding the push-off wall 14 the push-off device 12 comprises a first hydraulic cylinder arrangement 20, which comprises a first hydraulic cylinder piston 24 that is movable in a first hydraulic cylinder tube 22. For displacing the sliding floor 16 the push-off device 12 moreover comprises a second hydraulic cylinder arrangement 26, which comprises a second hydraulic cylinder piston 30 that is movable in a second hydraulic cylinder tube 28. The push-off wall 14 therein is mounted by means of two sliding elements 32, 34 on the second hydraulic cylinder tube 28.

Figure 2:
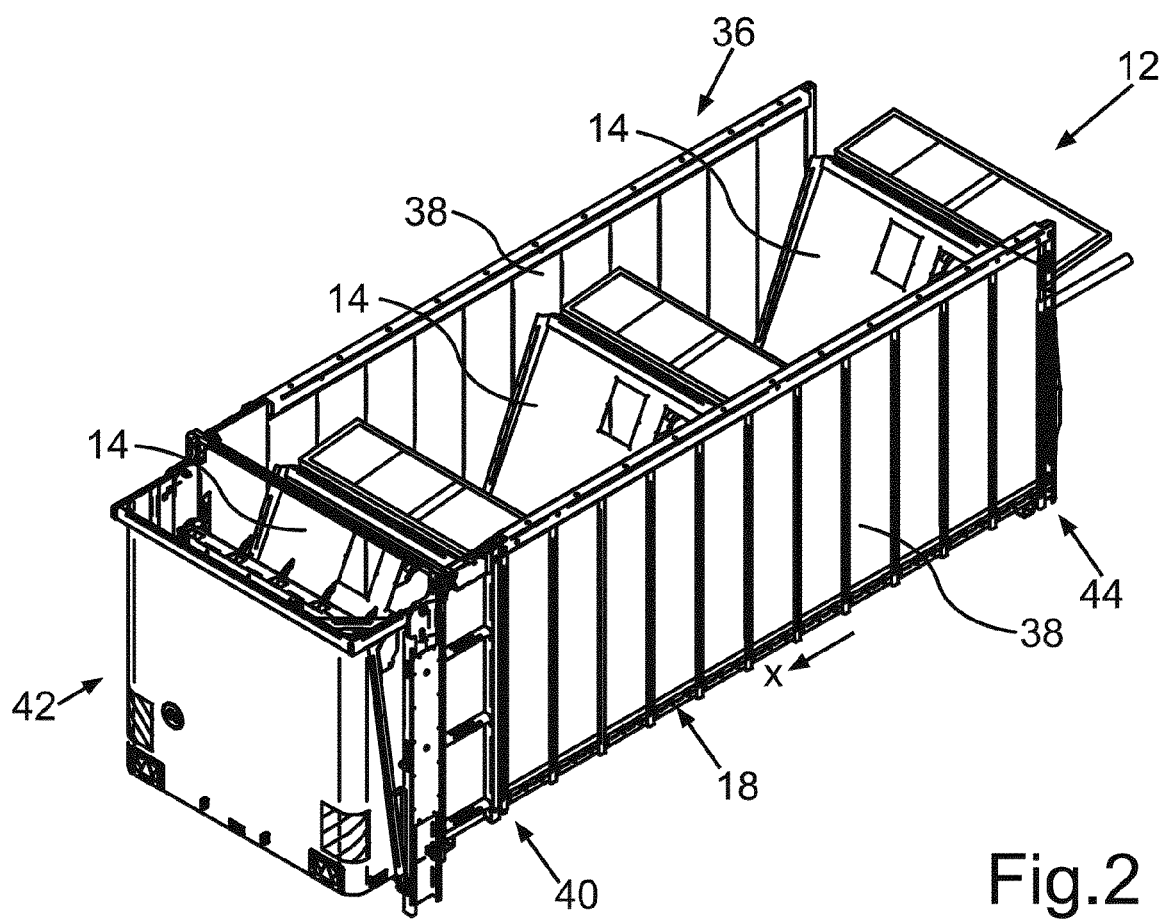
FIG. 2 a perspective view of the push-off device, wherein the push-off wall is shown arranged in three different positions.

In FIG. 2 the push-off device 12 without the chassis 11 is shown in a perspective view. The push-off wall 14 therein is shown in three different positions, contrary to the present representation consequently the push-off device 12 of course comprises only one single push-off wall 14. The push-off device 12 further comprises a loading space 36, which is well discernible here and which is formed by the loading floor 18, two laterally adjoining sidewalls 38, and the displaceable push-off wall 14. In the region of a front edge 40 of the loading floor 18 the loading space 36 moreover can be closed by a pivotable hatch 42.

As can be discerned in the present case, the push-off wall 14 consequently can be displaced in longitudinal direction x of the loading space 36. The push-off wall 14 therein can be shifted up to an unloading position far enough towards the front until the push-off wall 14 has arrived in the region of the front edge 40 of the loading floor 18. Thereby cargo loaded in the loading space 36, for instance agricultural bulk or the like, by means of the push-off device 12 can be particularly simply be conveyed off the loading floor 18. Moreover the push-off wall 14 can also be shifted back far enough for the push-off wall 14 to be positioned in the region of a rear edge 44 of the loading floor 18.

Figure 3:
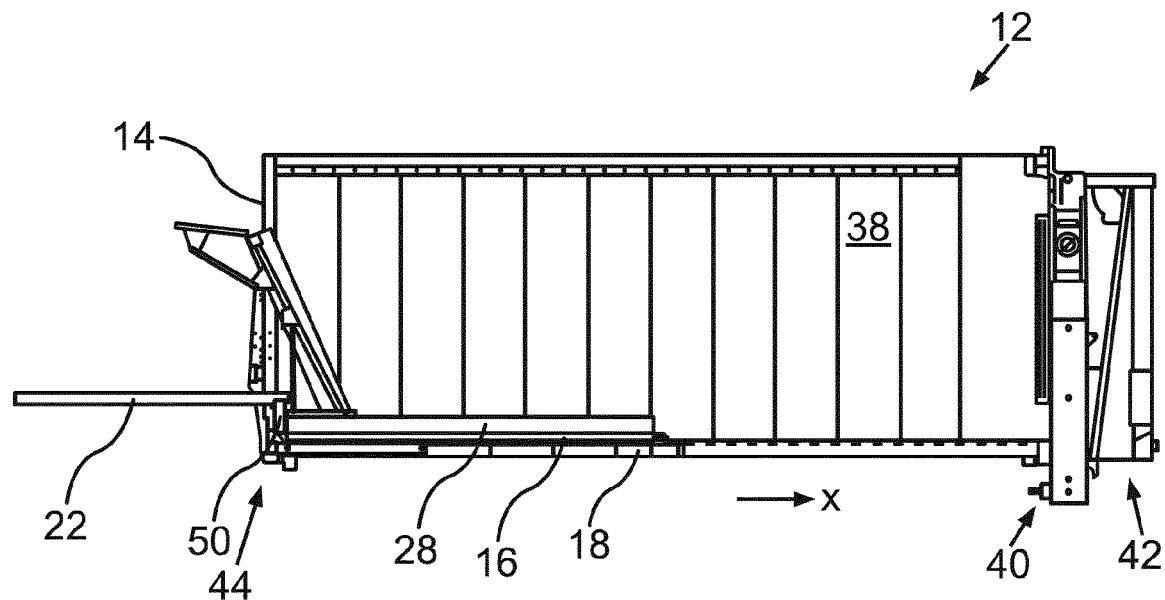
FIG. 3 a partly transparent lateral view of the push-off device, wherein the push-off wall is arranged in a fully retracted loading position.

In FIG. 3 the push-off device 12 is shown in a partly transparent lateral view, wherein the push-off wall 14 is arranged in its loading position so that the loading space 36 is maximized. In this position of the push-off wall 14 the two hydraulic cylinder pistons 24, 30 are completely retracted into the respective hydraulic cylinder tubes 22, 28, which also is the reason for the fact that in the present view the hydraulic cylinder pistons 24, 30 are not visible.

Figure 4:
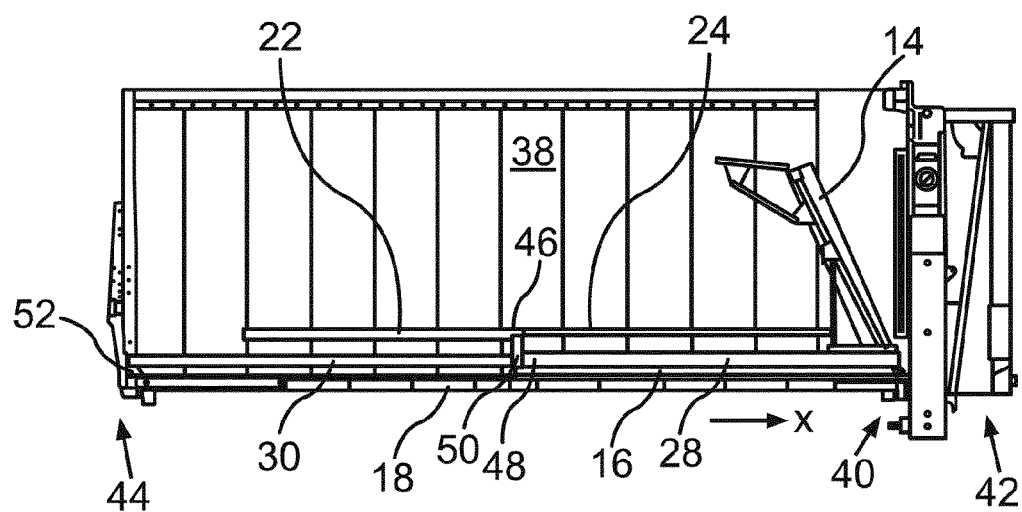
FIG. 4 a partly transparent lateral view of the push-off device, wherein the push-off wall is arranged in an extended unloading position, in which the push-off wall is positioned on a front edge of the loading floor of the loading space.

In FIG. 4 the push-off wall 14 is shown in its unloading position, in which the push-off wall 14 has been moved up to the front edge 40 of the loading floor 18. In this arrangement or positioning of the push-off wall 14 the two hydraulic cylinder pistons 24, 30 are fully extended. The maximum displacement path of the push-off wall 14 consequently results from addition of the respective stroke travel of the hydraulic cylinder arrangements 20, 26.

As can be discerned, the first hydraulic cylinder tube 22 is attached to the second hydraulic cylinder tube 28. The first hydraulic cylinder tube 22 and the second hydraulic cylinder tube 28 therein are attached to each other at respective longitudinal ends 46, 48, from which the respective hydraulic cylinder pistons 24, 30 can be extended. As can be discerned, therein the first hydraulic cylinder piston 24 and the second hydraulic cylinder piston 30 are arranged to be extendable in opposite directions. In order not to impair the extension and retraction movement of the respective hydraulic cylinder pistons 24, 30, the two hydraulic cylinder tubes 22, 28 are attached to each other under mediation of a radial spacer 50. Thereby the hydraulic cylinder pistons 24, 30 are spaced apart in radial direction, or in other words, in vertical direction of the push-off device 12, far enough from the respective hydraulic cylinder tubes 22, 28 for the hydraulic cylinder pistons 24, 30 to be able to be extended and retracted without colliding.

The first hydraulic cylinder piston 24 in turn is attached to the push-off wall 14. This means the first hydraulic cylinder arrangement 20 rests on the second hydraulic cylinder tube 28, and thus by extending and retracting the first hydraulic cylinder piston 24 can move the push-off wall 14 relative to the push-off floor 16. The second hydraulic cylinder piston 30 is attached to the immovable loading floor 18, wherein the second hydraulic cylinder tube 28 is attached to the sliding floor 16. The second hydraulic cylinder piston 30 consequently is not movable relative to the loading space 36 or to the immovable loading floor 18. Instead by a corresponding application with a hydraulic medium the second hydraulic cylinder tube 28 can be moved relative to the immoveable loading floor 18 of the loading space 36 and thereby move the movable sliding floor 16 relative to the loading floor 18. Since the push-off wall 14 is mounted on the second hydraulic cylinder tube 28, the push-off wall 14 is automatically moved along in the longitudinal direction x of the loading space 36, as soon as the second hydraulic cylinder piston 30 is extended or retracted, as a consequence of which the second hydraulic cylinder tube 28 is moved in longitudinal direction x.

On the front side at a free end of the second hydraulic cylinder piston 30 a bearing element 52 extending in radial direction therefrom is attached, under mediation of which the second hydraulic cylinder piston 30 is attached on the loading floor 18 of the loading space 36. The bearing element 52 contributes to keep the second hydraulic cylinder piston 30 from touching the loading floor 18 and thus to be able to be retracted and extended without colliding.

Figure 5:
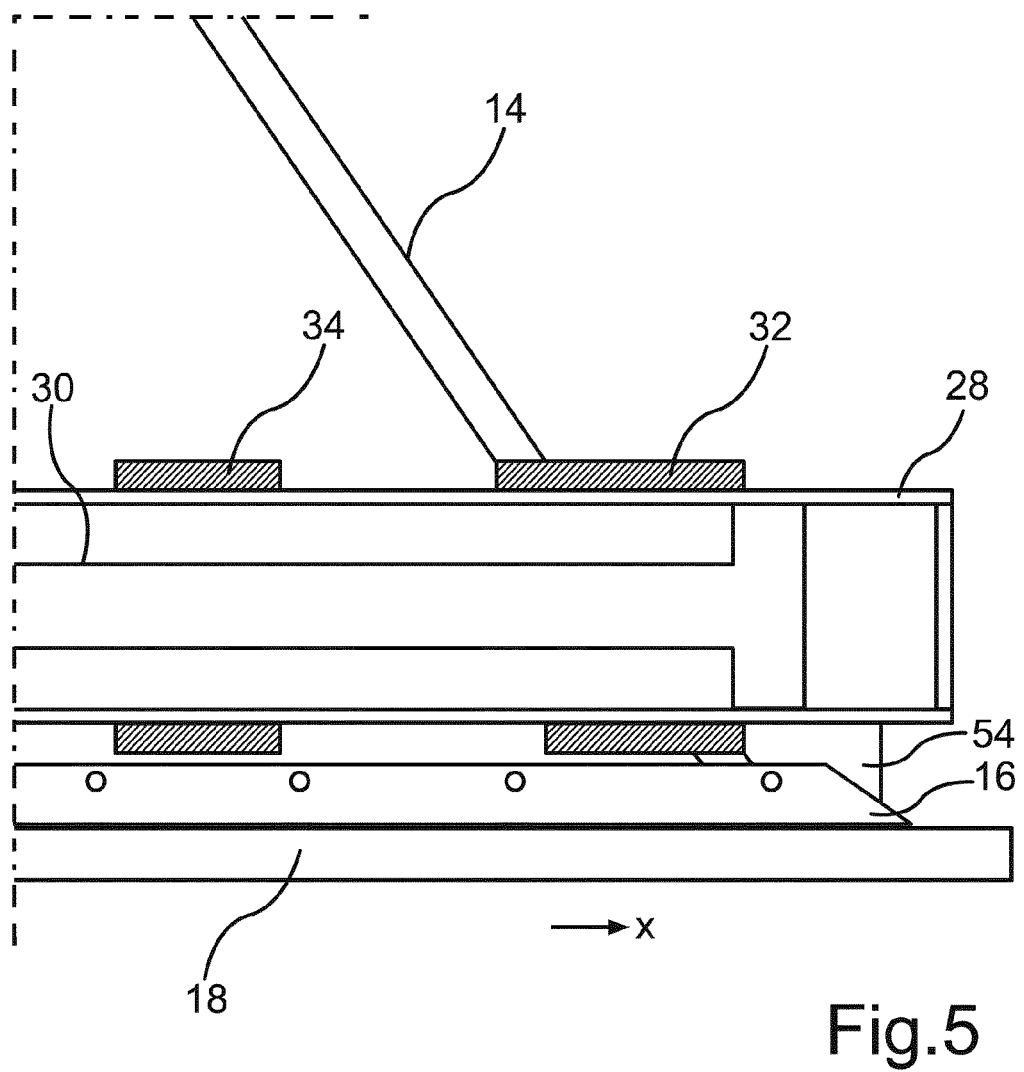
FIG. 5 a partly sectional detailed view of the mounting of the push-off wall; and in FIG. 6 a partly sectional front view, in which again the mounting of the push-off wall is schematically shown.

In FIG. 5 the mounting of the push-off wall 14 on the second hydraulic cylinder tube 28 is shown in a schematic lateral sectional view. Here once again the two sliding elements 32, 34, which enclose the second hydraulic cylinder tube 28 at least partly on the side of the outer circumference, can be discerned well. The two sliding elements 32, 34 therein are arranged slightly spaced apart from each other in an axial direction, i. e. in longitudinal direction x, so that the push-off wall 14 is mounted stably and possible tilting moments due to the eccentric application of force of the push-off wall 14 can be absorbed.

On the front side at a closed end of the second hydraulic cylinder tube 28 a bearing element 54 extending in radial direction is attached, under mediation of which the second hydraulic cylinder tube 28 is attached to the sliding floor 16. By the bearing element 54 the second hydraulic cylinder tube 28 can be arranged spaced apart from the sliding floor 16 far enough to allow for the sliding elements 32, 34 to be moved along the second hydraulic cylinder tube 28 without touching the sliding floor 16.

Figure 6:
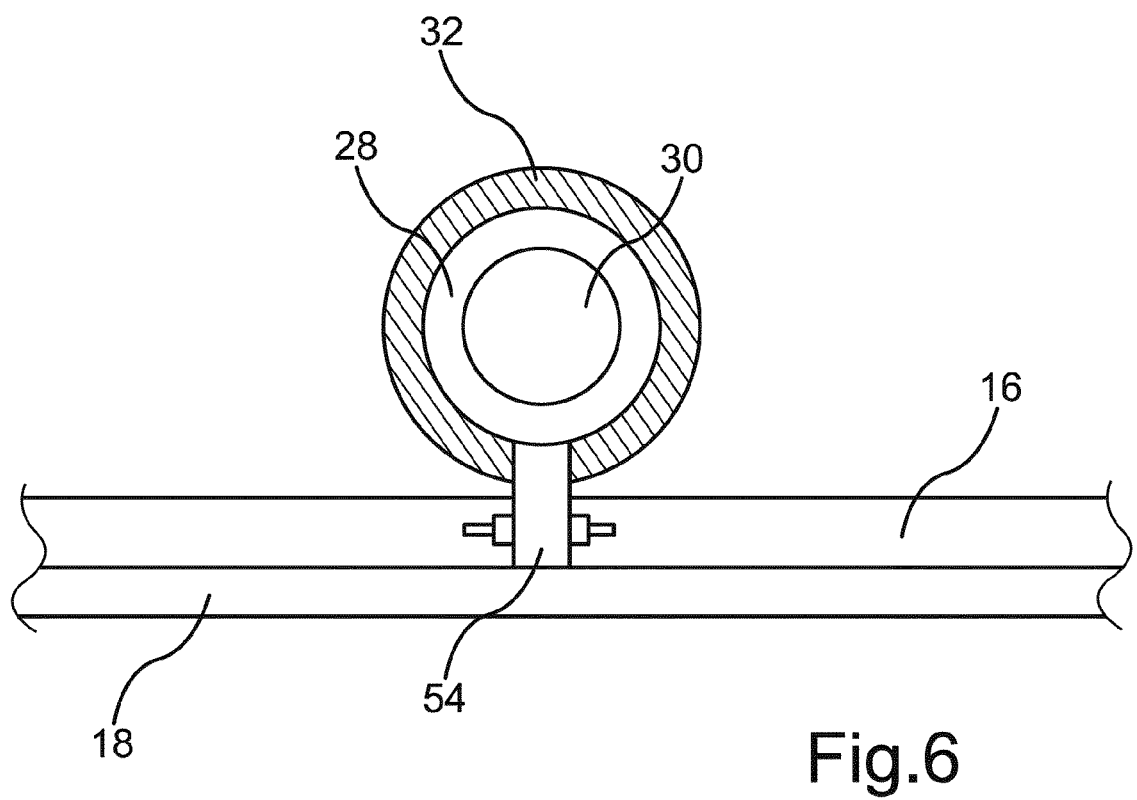

In FIG. 6 the mounting of the push-off wall 14 is once again shown schematically in a partly sectional front view. In the present representation once again the concentric arrangement of the sliding element 32 of the second hydraulic cylinder tube 28 and the second hydraulic cylinder piston 30 can be well discerned. The bearing element 54 for instance can be welded both to the second hydraulic cylinder tube 28 as well as to a sliding floor 16. However, also other attachment options, such as for instance screw joints or the like can be employed in order to connect the second hydraulic cylinder tube 28 with the sliding floor 16.

The invention claimed is:

1. A push-off device comprising:
a loading space, which comprises a loading floor, two laterally adjoining sidewalls and a push-off wall, which is translatable in a longitudinal direction (x) of the loading space relative to a sliding floor, which in turn is displaceable in the longitudinal direction (x) of the loading space relative to the loading floor of the loading space;
wherein
the push-off device comprises a first hydraulic cylinder arrangement, which comprises at least one first hydraulic cylinder piston that is movable in a first hydraulic cylinder tube;
the push-off device comprises a second hydraulic cylinder arrangement, which comprises at least one second hydraulic cylinder piston that is movable in a second hydraulic cylinder tube;
the push-off wall is mounted on the second hydraulic cylinder tube to be displaceable in the longitudinal direction (x) of the loading space, so that the second hydraulic cylinder tube serves as linear guidance for the translational movement of the push-off wall, wherein the push-off wall is displaceable by the first hydraulic cylinder arrangement relative to the sliding floor, which is displaceable by the second hydraulic cylinder arrangement relative to the loading floor of the loading space.

2. The push-off-device according to claim 1, wherein the first hydraulic cylinder tube is attached to the second hydraulic cylinder tube and the first hydraulic cylinder piston is attached to the push-off wall.

3. The push-off-device according to claim 1, wherein the second hydraulic cylinder piston is attached to the loading floor of the loading space and the second hydraulic cylinder tube is attached to the sliding floor.

4. The push-off-device according to claim 3, wherein on a front side at a closed end of the second hydraulic cylinder tube a bearing element extending in a radial direction is attached, under mediation of which the second hydraulic cylinder tube is attached to the sliding floor.

5. The push-off-device according to claim 3, wherein on a front side at a free end of the second hydraulic cylinder piston a bearing element extending in a radial direction is attached, under mediation of which the second hydraulic cylinder piston is attached to the loading floor of the loading space.

6. The push-off-device according to claim 1, wherein the first hydraulic cylinder piston and the second hydraulic cylinder piston are arranged to be extendable in opposite directions.

7. The push-off-device according to claim 1, wherein the first hydraulic cylinder tube and the second hydraulic cylinder tube are attached to each other at respective longitudinal ends, from which the respective hydraulic cylinder pistons are extendable.

8. The push-off-device according to claim 1, wherein the push-off wall by at least one sliding element, which encloses the second hydraulic cylinder tube at least partly on a side of an outer circumference, is mounted on the second hydraulic cylinder tube.

9. The push-off-device according to claim 8, wherein the push-off wall by a further sliding element, which encloses the second hydraulic cylinder tube at least partly on the side of the outer circumference and is spaced apart from the other sliding element in an axial direction, is mounted on the second hydraulic cylinder tube.

10. A push-off vehicle comprising a push-off device according claim 1.

* * * * *